Dec. 30, 1924.
G. ZINT
LAWN SPRINKLER
Filed Sept. 11, 1922   3 Sheets-Sheet 1
1,521,062
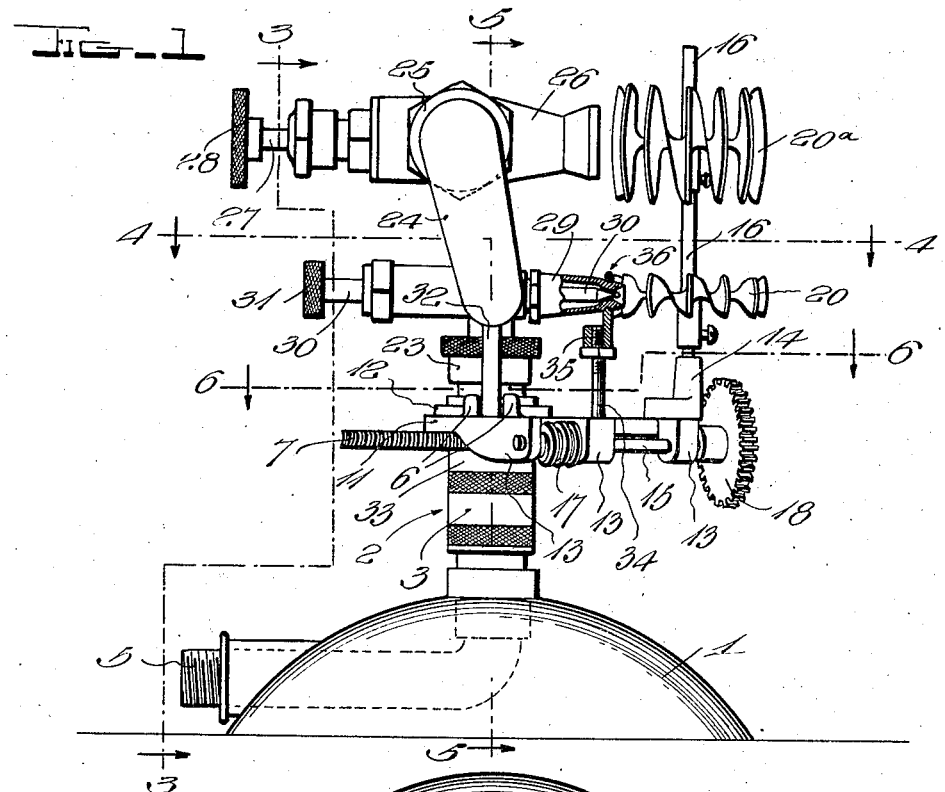
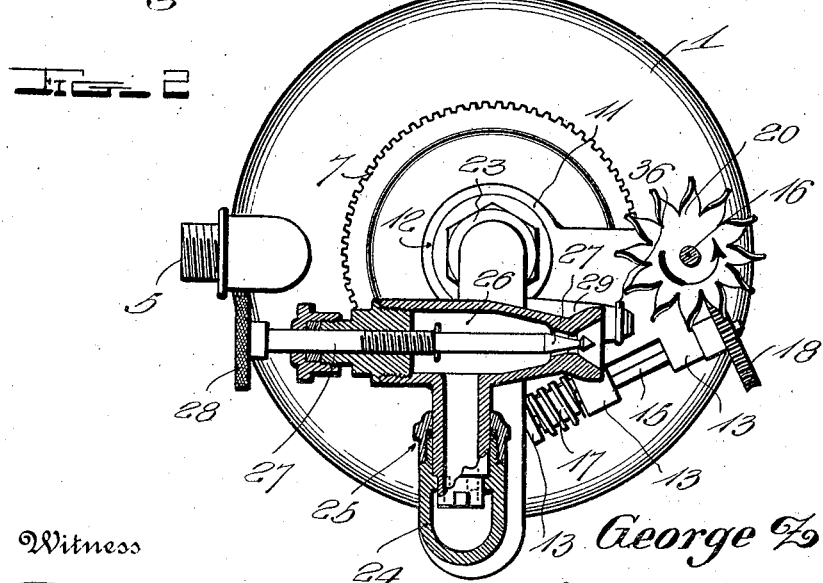
Inventor
George Zint

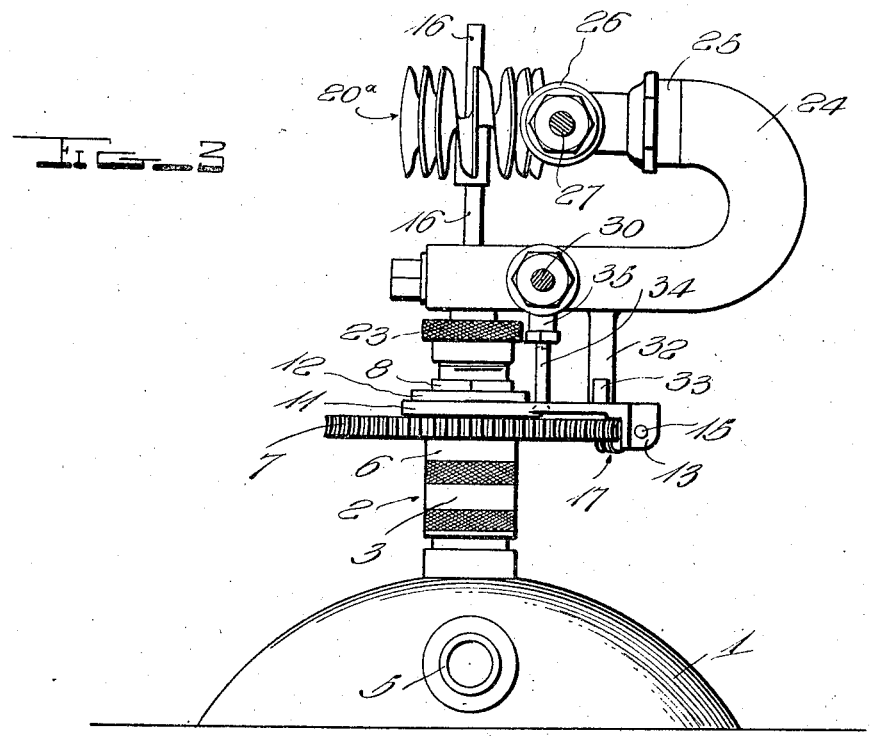
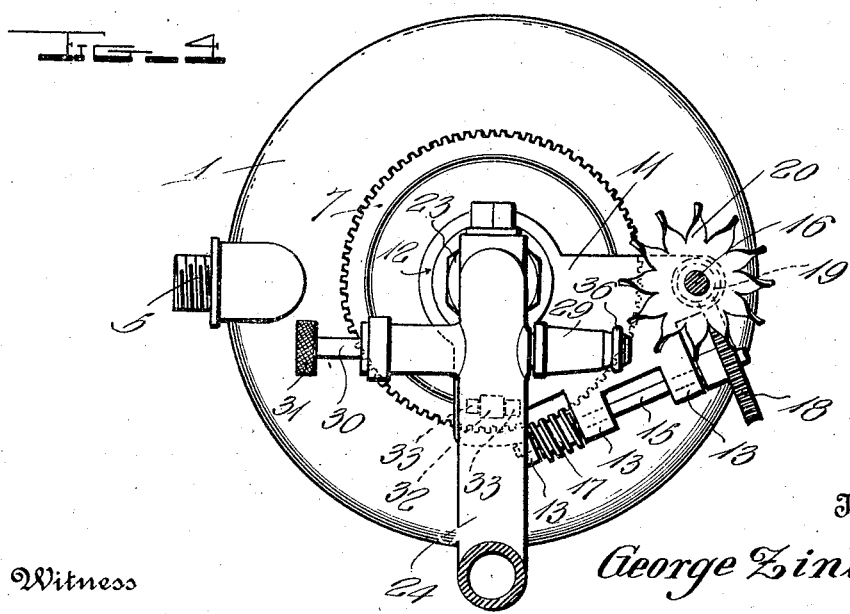

Dec. 30, 1924.
G. ZINT
1,521,062
LAWN SPRINKLER
Filed Sept. 11, 1922    3 Sheets-Sheet 3
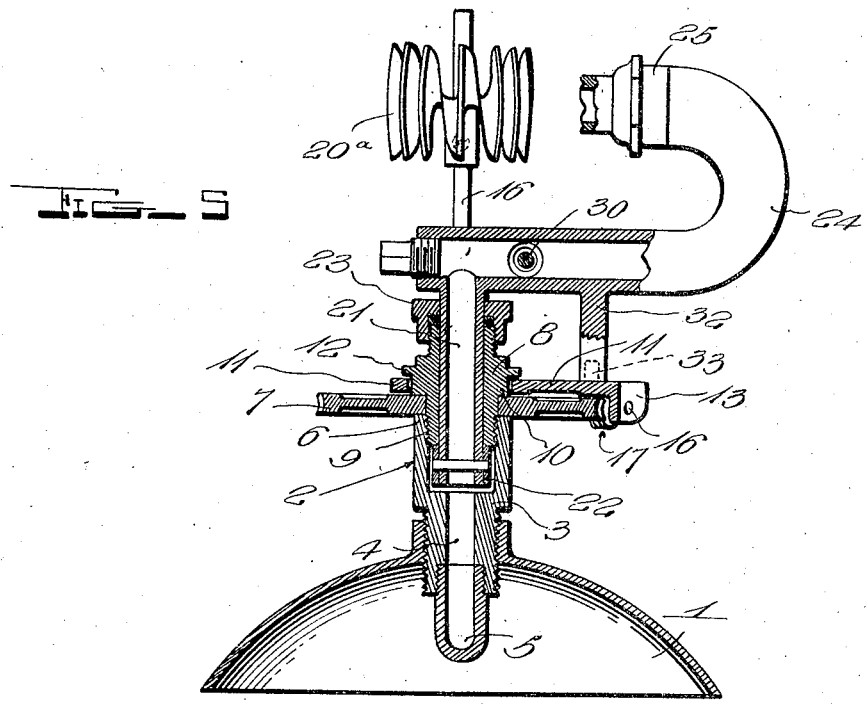
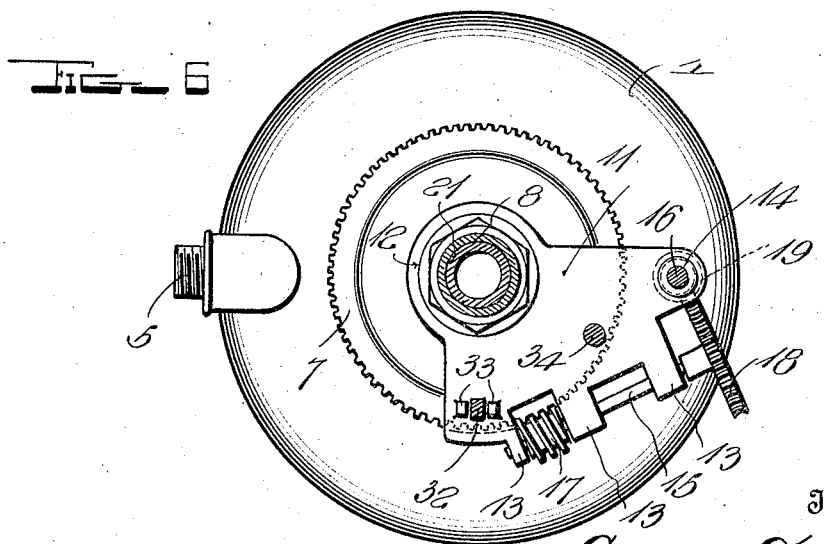
Inventor
George Zint
By H. B. Willson & Co.
Attorneys
Witness Patented Dec. 30, 1924.

1,521,062

UNITED STATES PATENT OFFICE.

GEORGE ZINT, OF WAPAKONETA, OHIO.

LAWN SPRINKLER.

Application filed September 11, 1922. Serial No. 587,481.

*To all whom it may concern:*

Be it known that I, GEORGE ZINT, a citizen of the United States, residing at Wapakoneta, in the county of Auglaize and State of Ohio, have invented certain new and useful Improvements in Lawn Sprinklers; and I do declare the following to be a full, clear, and exact description of the invention, such as will enable others skilled in the art to which it appertains to make and use the same.

My invention relates to improvements in water sprinklers such as those used for lawns, flower beds, gardens, etc., and has reference more particularly to sprinklers of the type in which the sprinkling head or nozzle is turned around a vertical axis automatically by means actuated from a water wheel. A device of this character is shown by my U. S. Patent No. 1,146,228 of July 13, 1915. The object however of the present invention is to generally improve and simplify the construction shown by this patented sprinkler, one of the improvements being the substitution of a water spraying nozzle for the nozzle shown by the prior patent, which nozzle merely directs a stream of water against the water wheel instead of a spray. It has been found that this stream of water is injurious to small plants and often washes seed out of the ground, whereas if the water is sprayed against the water wheel, no such injurious results are obtained.

With the foregoing in view, the invention resides in the novel subject matter hereinafter described and claimed, the description being supplemented by the accompanying drawings.

Figure 1 is a side elevation of a sprinkler constructed in accordance with my invention.

Figure 2 is a top plan view, parts being shown in section in this figure as well as in Fig. 1.

Figure 3 is a vertical sectional view as indicated by line 3—3 of Fig. 1.

Figure 4 is a horizontal section on line 4—4 of Fig. 1.

Figure 5 is a vertical section on line 5—5 of Fig. 1.

Figure 6 is a horizontal sectional view as indicated by line 6—6 of Fig. 1.

In the drawings above briefly described, the numeral 1 designates an appropriate base from which a hollow post rises, said post being indicated in a general way by the reference character 2. This post includes a lower section 3 threaded into the base 1 and provided with a water passage 4 which communicates with a suitable water supply pipe 5 with which the base is provided. The upper end of the post section 3 is provided with an upwardly opening socket 6 and a worm wheel 7 rests upon said upper end. An upright sleeve 8 passes through an opening in the center of the worm wheel 7 and is threaded at 9 into the upper end of the post section 3, said sleeve being provided with a shoulder 10 which frictionally clamps the worm wheel 7 against the post section 3, whereby to hold said wheel against rotation.

The portion of the sleeve 8 immediately above the shoulder 10, passes in a comparatively loose manner through an opening in the horizontal carrier 11, and the sleeve 8 is provided with another shoulder 12 which overlies the carrier 11 to hold the same against possible upward movement.

The carrier 11 is provided with horizontal bearings 13 at its outer end and with at least one vertical bearing 14, said horizontal and vertical bearings receiving horizontal and vertical shafts 15 and 16 respectively. The shaft 15 is provided with a worm 17 meshing with the worm wheel 7, said shaft being also provided with a worm wheel 18 at its opposite end which meshes with a worm 19 on the vertical shaft 16. This vertical shaft is provided with a water wheel 20, rotation of which causes rotation of the worm 17 and thereby moves the entire carrier 11 around the post.

A tubular rotatable post section 21 is received within the sleeve 8 and is provided with a suitable retaining collar 22 within the socket 6, a stuffing box 23 being provided at the upper end of said sleeve to prevent leakage of water around the post section 21. The upper end of this section carries a horizonally disposed head or neck 24 having its outer end portion curved upwardly and inwardly and connected by a suitable coupling 25 to a main water spraying nozzle 26 whose valve 27 may be adjusted by a suitable hand wheel 28.

The lower arm of the neck 24 carries a rigid laterally extending supplemental nozzle 29 which is intended to spray water against the water wheel 20, instead of directing a single stream of water against said wheel. The nozzle 29 is provided with an adjustable valve 30 operable by means of a hand wheel or the like 31, so that the strength of the spray may be varied. By spraying the water against the wheel 21, instead of directing a single stream against said wheel as in the prior patented device, there is no danger of flooding the ground around the sprinkler, of washing channels therein and thereby washing seed from the earth, and no danger exists of injuring small plants.

I prefer to extend the shaft 16 a sufficient distance above the wheel 20 to permit the addition of a second water wheel 20$^a$ in operative relation with the main nozzle 26, if the water pressure is insufficient to operate the wheel 20 and thereby cause movement of the nozzle upon a vertical axis.

Attention is directed to the fact that a suitable driving connection such as a depending arm 32 on the neck 24, fitting between lugs 33 on the carrier 11 is provided between said carrier and the rotatable post section 21. Thus, since the worm wheel 7 cannot rotate, rotation of the worm 17 will cause the carrier 11 to travel around said wheel and the driving connection 32—33, causes the post section 21 and its neck and nozzles to move in the same manner. During this movement, the carrier 11 is supported against dragging upon the worm wheel 7, by an appropriate hanger rod 34 which extends upwardly through said carrier and is threaded at its upper end into a lug 35 on a ring 36 surrounding the outer end of the supplemental nozzle 29.

By employing the construction shown or a substantial equivalent thereof, a device is provided which will be extremely simple and comparatively inexpensive, yet will be greatly advantageous over similar devices heretofore used. As excellent results may be obtained from the details disclosed, it will be understood that they are preferably followed, but within the scope of the invention as claimed, numerous minor changes may of course be made. It may be further stated that while I prefer to use two nozzles, as above set forth, together with one or two water wheels, it will be clear that any number of nozzles and wheels may be used.

I claim:

1. A sprinkler comprising an upright hollow post having a water inlet and, provided with a rotatable section at its upper end carrying a nozzle, a non-rotatable worm wheel carried horizontally by said post, a horizontal carrier rotatable around said post over said worm wheel and having a driving connection with said rotatable post section, a hanger for the outer end portion of said carrier preventing dragging thereof on said worm wheel, said carrier having horizontal and vertical bearings carrying horizontal and vertical shafts, worm gearing for driving the horizontal shaft from the vertical shaft, a worm on said horizontal shaft meshing with said worm wheel, and a water wheel on said vertical shaft disposed in the path of the water sprayed from said nozzle.

2. A structure as specified in claim 1 having said carrier provided with a ring at its upper end surrounding said nozzle, whereby the outer end of said carrier is supported from said nozzle.

3. A sprinkler comprising a base provided with a lower post section having a water passage, a worm wheel resting on said post section, a sleeve passing through said worm wheel and threaded into the upper end of said post section, said sleeve having a shoulder frictionally clamping said wheel against said post section and having another shoulder above said first named shoulder, a carrier through which said sleeve passes, said carrier being confined between said second shoulder and said worm wheel, a rotatable post section received in said sleeve, a horizontally disposed head carried by the upper end of said rotatable post-section and having one end portion curved upwardly and inwardly, upper and lower nozzles carried by said head, a worm mounted on said carrier and meshing with said worm wheel, means mounted on said carrier for rotating said worm including a water wheel in the path of the spray from said lower nozzle, a ring surrounding said lower nozzle, and a hanger for the outer end of said carrier depending from said ring.

In testimony whereof I have hereunto affixed my signature.

GEORGE ZINT.